(12) United States Patent
Kurihara (10) Patent No.: US 8,995,661 B2
(45) Date of Patent: Mar. 31, 2015

(54) INFORMATION PROVISION SYSTEM, PROVISION INFORMATION COPYING DEVICE, USER TERMINAL DEVICE AND USER MANAGEMENT DEVICE

(75) Inventor: Shinichi Kurihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1624 days.

(21) Appl. No.: 11/453,092

(22) Filed: Jun. 15, 2006

(65) Prior Publication Data

US 2006/0288403 A1     Dec. 21, 2006

(30) Foreign Application Priority Data

Jun. 17, 2005   (JP) .................................. 2005-178056

(51) Int. Cl.
*G06F 21/00* (2013.01)
*H04L 29/06* (2006.01)
*G06F 21/10* (2013.01)

(52) U.S. Cl.
CPC ................ *H04L 63/06* (2013.01); *G06F 21/10* (2013.01); *H04L 63/0428* (2013.01)
USPC ........... 380/201; 380/277; 380/278; 380/279; 726/4; 726/26; 726/27; 726/29; 726/30; 713/155; 713/168; 713/171

(58) Field of Classification Search
CPC ............ G06F 21/10; G06F 2221/0753; H04L 2209/60; H04L 2209/605; H04L 9/32
USPC ........ 726/4, 26, 27, 29, 30; 713/15, 168, 171; 380/201, 277–179, 277–279
See application file for complete search history.

(56) References Cited

U.S. PATENT DOCUMENTS

| 5,502,766 A | * | 3/1996 | Boebert et al. ................. 713/193 |
| 5,991,399 A | | 11/1999 | Graunke et al. |

(Continued)

FOREIGN PATENT DOCUMENTS

| CN | 1607485 A | 4/2005 |
| EP | 0 561 685 | 9/1993 |

(Continued)

OTHER PUBLICATIONS

Liu, Qiong, Reihaneh Safavi-Naini, and Nicholas Paul Sheppard. "Digital rights management for content distribution." Proceedings of the Australasian information security workshop conference on ACSW frontiers 2003—vol. 21. Australian Computer Society, Inc., 2003.*
Hirai, Tatsuya. "Content protection technology for a novel removable drive." Magnetics, IEEE Transactions on 41.2 (2005): 860-869.*
Official Action issued Aug. 4, 2009 by the Canadian Patent Office in Canadian Patent Application No. 2,550,560 (3 pages).

(Continued)

*Primary Examiner* — Luu Pham
*Assistant Examiner* — Kari Schmidt
(74) *Attorney, Agent, or Firm* — Finnegan, Henderson, Farabow, Garrett & Dunner, LLP (57) ABSTRACT

A content encryption device generates encrypted content and an encrypted content copying device copies the encrypted content on an information storage medium. The storage medium is sold at a charge or distributed at no charge. A user gets the storage medium to connect or set it to or in a user terminal device, accesses to a user management device to receive permission by authentication information distributed together with the storage medium and presents a part or a whole of medium information to a content key distribution device. The distribution device makes a content key encryption device issue an encrypted content key on the basis of the presented information and distributes it to the terminal device.

3 Claims, 6 Drawing Sheets

(56) References Cited

U.S. PATENT DOCUMENTS

| | | | |
|---|---|---|---|
| 6,243,468 B1* | 6/2001 | Pearce et al. | 380/255 |
| 6,834,348 B1* | 12/2004 | Tagawa et al. | 713/193 |
| 7,178,037 B2* | 2/2007 | Shimada et al. | 713/193 |
| 7,570,762 B2 | 8/2009 | Kurihara et al. | |
| 8,015,417 B2* | 9/2011 | Kato et al. | 713/193 |
| 2002/0026424 A1* | 2/2002 | Akashi | 705/57 |
| 2002/0049678 A1 | 4/2002 | Oshima et al. | |
| 2002/0077988 A1* | 6/2002 | Sasaki et al. | 705/59 |
| 2002/0112172 A1 | 8/2002 | Simmons | |
| 2002/0150251 A1* | 10/2002 | Asano et al. | 380/277 |
| 2002/0157012 A1 | 10/2002 | Inokuchi et al. | |
| 2003/0123670 A1 | 7/2003 | Shimada et al. | |
| 2003/0126430 A1* | 7/2003 | Shimada et al. | 713/155 |
| 2003/0145183 A1 | 7/2003 | Muehring | |
| 2005/0021774 A1 | 1/2005 | Kurihara et al. | |
| 2005/0114689 A1* | 5/2005 | Strom et al. | 713/193 |
| 2005/0171913 A1 | 8/2005 | Kurihara et al. | |
| 2006/0200865 A1* | 9/2006 | Leake et al. | 726/27 |
| 2006/0230463 A1* | 10/2006 | Cawlfield et al. | 726/27 |

FOREIGN PATENT DOCUMENTS

| | | | | |
|---|---|---|---|---|
| EP | 1519604 | * | 3/2005 | ............ H04Q 7/38 |
| EP | 1714280 A1 | | 8/2005 | |
| EP | 1418580 A2 | | 3/2007 | |
| GB | 2401965 | | 11/2004 | |
| JP | 2004-35150 | | 5/2004 | |
| WO | WO 01/86387 A1 | | 11/2001 | |

OTHER PUBLICATIONS

Office Action dated Jun. 26, 2009 by Chinese Patent Office in Chinese Patent Application No. 200610093794.6 (10 pages + 19 page translation).

Search Report dated Sep. 10, 2009 by United Kingdom Patent Office in UK Patent Application No. GB0822275.4 (2 pages).

Search Report dated Sep. 7, 2009 by United Kingdom Patent Office in UK Patent Application No. GB0822274.7 (3 pages).

Combined Search and Examination Report for Application No. GB0611912 (3 pages).

* cited by examiner

INFORMATION PROVISION SYSTEM, PROVISION INFORMATION COPYING DEVICE, USER TERMINAL DEVICE AND USER MANAGEMENT DEVICE

CROSS-REFERENCE TO RELATED APPLICATIONS

This application is based upon and claims the benefit of priority from prior Japanese Patent Application No. 2005-178056, filed Jun. 17, 2005, the entire contents of which are incorporated herein by reference.

BACKGROUND OF THE INVENTION

1. Field of the Invention

The present invention relates to an information provision system for providing content information to a terminal device on a user side, a provision information copying device, a user terminal device and a user management device for use in the system.

2. Description of the Related Art

In recent years, it has become possible to distribute an enormous data quantity of content by using a communication line owing to the progress of a communication technology such as the Internet and a data compression technique depending on digital signal processing. Thereby, a customer has become possible to receive a content distribution service for music, movies games, etc., regardless of time and place. An information provision system for achieving this content distribution service has generally a configuration in that a customer desiring purchasing/viewing (hereinafter referred to as user) accesses to a content distribution center through communication terminal equipment to download desired content from the distribution center or receives a stream distribution.

However, in the present situation, even when the user accesses to the distribution center, there are many cases, for popular and topical content, that only an introduction thereof or an advertisement therefor is provided and content for viewing is distributed thorough a mail order of a medium with the content recorded thereon. This is because a copyright owner of the content (or copyright manager, hereinafter both concepts are generally referred to as a copyright owner in some cases) still fears to suffer tremendous damage caused by a copyright infringement such as illegal copying with respect to a distribution to a user terminal device using the communication line. Like this, in the content distribution service, a distribution of important content has been in an extremely inactive situation, because a problem in an illegal distribution becomes a fetter, even if the content distribution service is desired by the user or attractive in business.

Thus, recently, a technique to prevent the illegal distribution of content has been presented, in which information storage medium and a user terminal device implement copyright protection on the basis of license information given from each license agency. This technique has been publicly known commonly as content protection for recordable media (CPRM) and Advanced access content system (AACS).

An information provision system for the content distribution service in order to achieve perfect copyright protection is disclosed in Jpn. Pat. Appln. KOKAI Publication No. 2004-35150. This system utilizes the aforementioned CPRM technique to implement the copyright protection on the basis of the license information given from the license agency in the information storage medium, the user terminal device, a content encryption device and a content key encryption device. The content distribution center manages the content in an encrypted state and realizes a wide variety of types of copyright protection which enables controlling a content illegal outflow from the inside and outside of the distribution center and authentication processing among each enterprise and each device.

However, in a conventional information provision system described above, encrypted content with an enormous quantity of data has been transmitted via the communication line, traffic volume on the communication line increases as the number of users increases; the increase becomes a possible trigger of communication interference as well as it causes taking a long time to download the content. And the impossibility of an acquisition of content information without a user registration causes the difficulty of the user registration.

BRIEF SUMMARY OF THE INVENTION

An object of the present invention is to provide an information provision system capable of securing sufficient copyright protection even if the system distributes content information with a tremendous quantity of data in a distribution form without using a high-speed communication line and even if in a sate before a user registration, its provision information copying device, a user terminal device and a user management device.

An information provision system, regarding the present invention to provide content information to a user terminal device, which enables recording the content information on an information storage medium with medium information of medium unique identifier and medium key information written, or at least medium information of medium unique identifier written therein, or on another information storage medium different from the information storage medium in a state in which the information storage medium is set in the terminal device, the system comprises: a content encryption device which acquires content key generation conditions together with the content information from a copyright owner or a copyright manager of the content information, generates a content key on the basis of the content key generation conditions and encrypts the content information by using the content key to generate encrypted content; a content key encryption device which registers the whole or a part of the medium information of the information storage medium as well as stores the content key generated from the content encryption device, uses the medium information or the medium information and device unique information of the user terminal device presented from the user terminal device when content is required, and then encrypts a content key corresponding to the required content to generate an encrypted content key; an encrypted content key distribution device which acquires the medium information together with specification information of the required content from the user terminal device to send it as content identification information to the content key encryption device and distributes the encrypted content key from the key encryption device to the user terminal device of a request origin via a communication line; a user management device which receives a user registration of the user terminal device in advance to issue authentication information individually and issues specified authentication information to permit access separately from the authentication information of the registered user; and an encrypted content copying device which writes the encrypted content generated from the content encryption device onto the information storage medium with the medium information written therein to create an information storage medium with the encrypted content copied thereon, and the system distributes the copied information storage medium with the encrypted content copied thereon together with the specified authentication information, wherein the user terminal device accesses to the user management device by using the specified authentication information via the communication line at viewing the copied information storage medium, presents the medium information or the medium information and the device unique information together with the content information stored in the copied information storage medium, and then acquires the encrypted content key to decrypt the encrypted content stored in the copied information storage medium from the encrypted content key distribution device to decrypt the content key.

A provision information copying device, regarding the present invention, which is used for the information provision system to provide content information to a user terminal device which enables recording the content information on an information storage medium with medium information of medium unique identifier and medium key information written, or at least medium information of medium unique identifier written therein, or on another information medium different from the information storage medium in a state in which the information storage medium is set in the terminal device, and the system is composed of: a content encryption device which acquires content key generation conditions together with the content information from a copyright owner or a copyright manager of the content information, generates a content key on the basis of the content key generation conditions and encrypts the content information by using the content key to generate encrypted content; a content key encryption device which registers the whole or a part of the medium information of the information storage medium as well as stores the content key generated from the content encryption device, uses the medium information or the medium information and device unique information of the user terminal device presented from the user terminal device when content is required, and then encrypts the content key corresponding to the required content to generate an encrypted content key; an encrypted content key distribution device which acquires the medium information together with specification information of the required content from the user terminal device to send it as content identification information to the content key encryption device and distributes the encrypted content key from the encryption device to the user terminal device of a request origin via a communication line; and a user management device which receives a user registration of the user terminal device in advance to issue authentication information individually and issues specified authentication information to permit access separately from the authentication information of the registered user, the copying device comprises: an encrypted content storage unit which stores the encrypted content generated from the content encryption device; a copy processing unit which reads out encrypted content from the encrypted content storage unit and writes it in the information storage medium with the medium information written therein to create a copy of the encrypted content; and specified authentication information adding means for adding the specified authentication information issued from the user management device to the information storage medium with the encrypted content copied thereon.

A user terminal device, regarding the present invention, which is used for an information provision system to provide content information and enables recording the content information on an information storage medium with medium information of medium unique identifier and medium key information written, or at least medium information of medium unique identifier written therein, or on another information medium different from the information storage medium in a state in which the information storage medium is set in the terminal device, and the system is composed of: a content encryption device which acquires content key generation conditions together with the content information from a copyright owner or a copyright manager of the content information, generates a content key on the basis of the content key generation conditions and encrypts the content information by using the content key to generate encrypted content; a content key encryption device which registers the whole or a part of the medium information of the information storage medium as well as stores the content key generated from the content encryption device, uses the medium information or the medium information and device unique information of the user terminal device presented from the user terminal device when content is required, and then encrypts the content key corresponding to the required content to generate an encrypted content key; an encrypted content key distribution device which acquires the medium information together with specification information of the required content from the user terminal device to send it as content identification information to the content key encryption device and distributes the encrypted content key from the key encryption device to the user terminal device of a request origin via a communication line; a user management device which receives a user registration of the user terminal device in advance to issue authentication information individually and issues specified authentication information to permit access separately from the authentication information of the registered user; and an encrypted content copying device which writes the encrypted content generated from the content encryption device into the information storage medium with the medium information written therein to create the information storage medium with the encrypted content copied thereon, the terminal device comprises: access means for accessing the user management device by using the specified authentication information via the communication line in viewing the copied information storage medium while distributing the copied information storage medium with the encrypted contents copied thereon together with the specified authentication information; content key acquiring means for acquiring the encrypted content key distributed from the encrypted content key distribution device by presenting the content information and the medium information stored in the copied information storage medium, or presenting the medium information and the device unique information; content key decryption means for decrypting the encrypted content key on the basis of the medium information stored in the copied information storage medium, or of the medium information and the device unique information; and content reproduction means for reproducing the encrypted content recorded on the copied information storage medium by using the decrypted content key.

A user management device, regarding the present invention, which is used for the information provision system to provide content information to a user terminal device which enables recording the content information on an information storage medium with medium information of medium unique identifier and medium key information written, or at least medium information of medium unique identifier written therein, or on another information medium different from the information storage medium in a state in which the information storage medium is set in the terminal device, the system is composed of: a content encryption device which acquires content key generation conditions together with the content information from a copyright owner or a copyright manager of the content information, generates a content key on the basis of the content key generation conditions and encrypts the content information by using the content key to generate encrypted content; a content key encryption device which registers the whole or a part of the medium information of the information storage medium as well as stores the content key generated from the content encryption device, uses the medium information or the medium information and device unique information of the information terminal device presented from the user terminal device when a content is required, and then encrypts the content key corresponding to the required content to generate an encrypted content key; an encrypted content key distribution device which acquires the medium information together with specification information of the required content from the user terminal device to send it as content identification information to the content key encryption device and distributes the encrypted content key from the encryption device to the user terminal device of a request origin via a communication line; and an encrypted content copying device which writes the encrypted content generated from the content encryption device into the information storage medium with the medium information written therein to create the information storage medium with the encrypted content copied thereon, and the user management device which receives a user registration of the user terminal device in advance to issue authentication information individually comprises: specified authentication information issue means for issuing specified authentication information so as to permit access when the access for a viewing request is performed from the user terminal with the information storage medium set therein by adding the specified authentication information in distributing the information storage medium with the encrypted contents copied thereon; information requiring means for requiring a presentation of content information and medium information stored in the copied information storage medium or the medium information and the device unique information to the user terminal device, when the access is permitted; and distribution control means for making the encrypted content key distribution device distribute the encrypted content key when the information is presented from the user terminal device, wherein the distribution control means determines presence or absence of the user registration from the authentication information presented when the access is performed and switches over content viewing conditions in response to the presence or absence of the registration to make the encrypted content key distribution device distribute the encrypted content key.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be explained in detail with reference to the drawings.

Figure 1A:
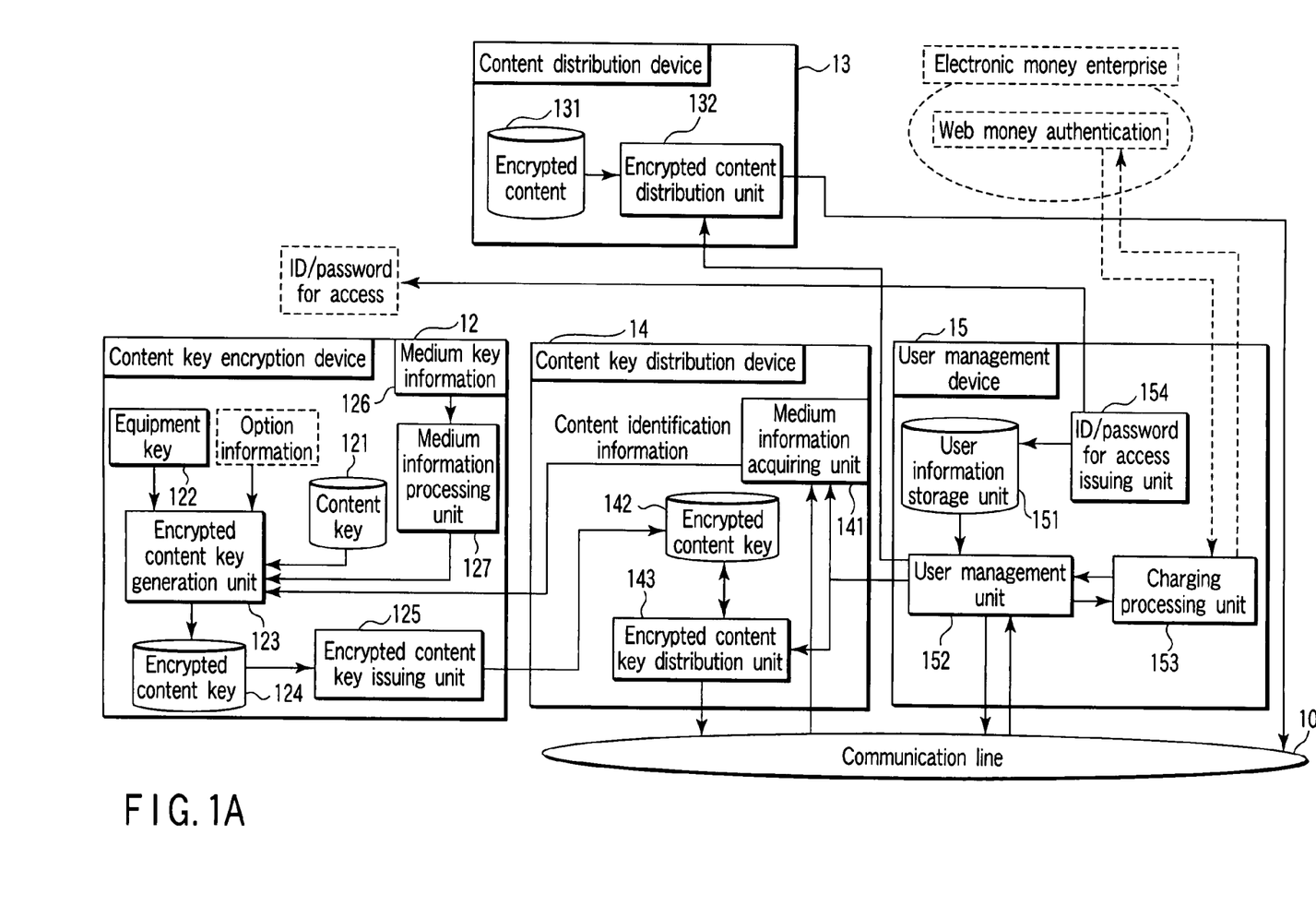
FIGS. 1A, 1B and 1C are exemplary block diagrams showing a configuration of an embodiment of an information provision system regarding the present invention.
Figure 1B:
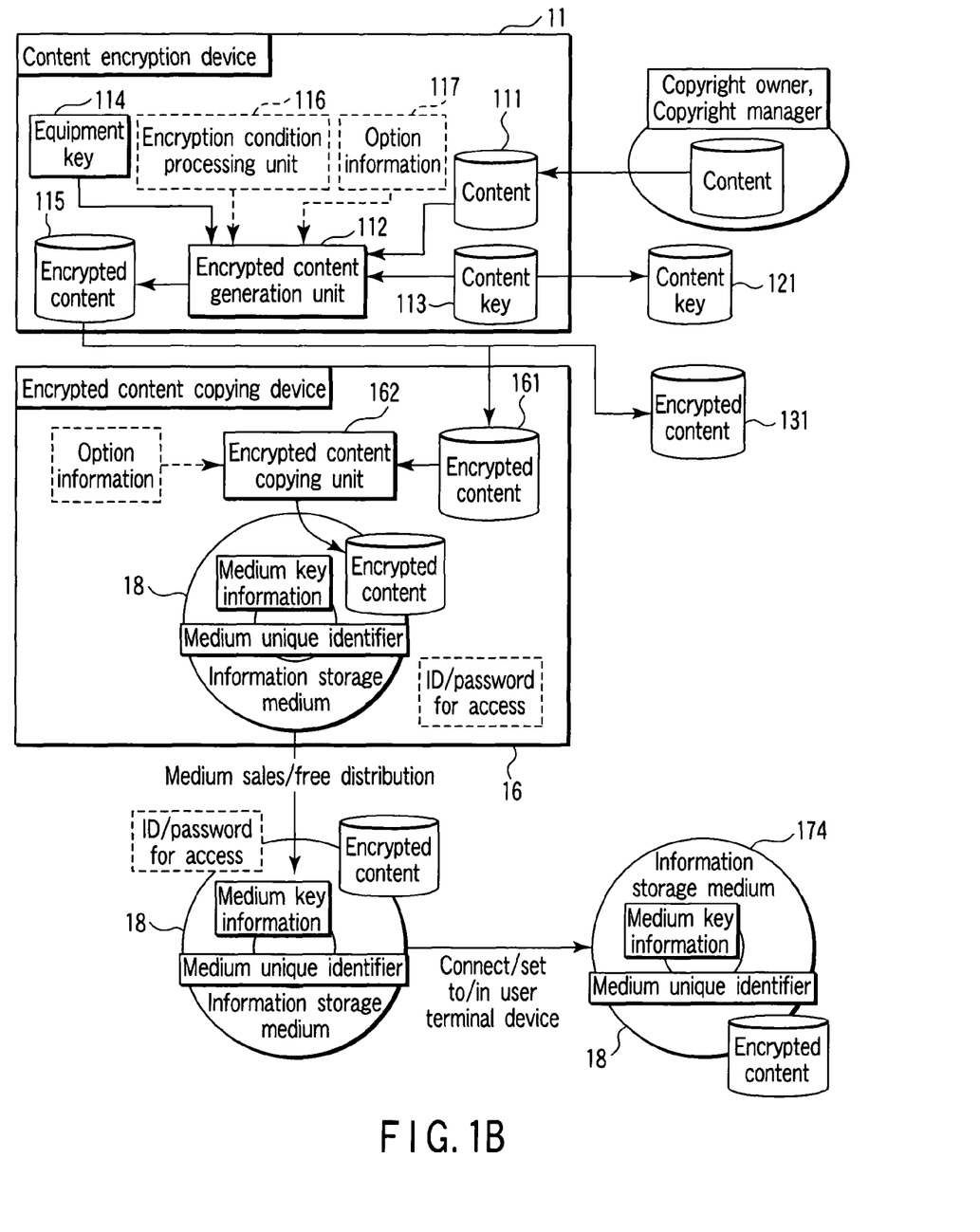
Figure 1C:
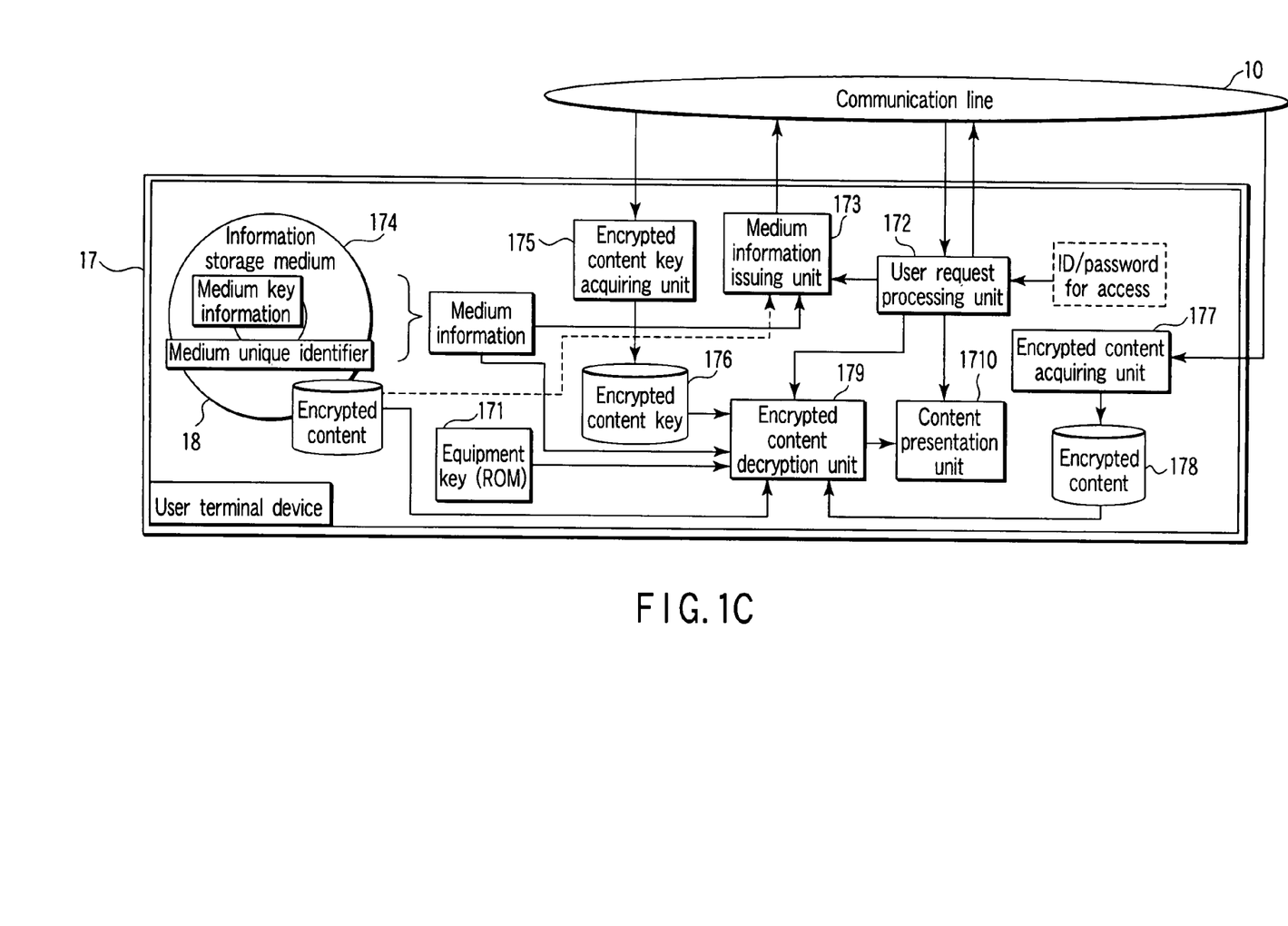

FIGS. 1A, 1B and 1C are functional block diagrams showing an embodiment of a system which achieves a content distribution service having a copyright protection function as an information provision system regarding the present invention.

In the system shown in FIGS. 1A, 1B and 1C, a device on an information provider includes an encrypted content copying device 16 in addition to a content encryption device 11, a content key encryption device 12, a content distribution device 13, a content key distribution device 14 and a user management device 15. On the other hand, a user terminal device 17 provided as a device on a user side has a function to communicate with the content distribution device 13, content key distribution device 14 and user management device 15 via a communication line 10 and a function to write distributed content information in an information storage medium 18, read out it from the storage medium 18 and record/reproduce it.

At this point, in the user terminal device 17, for instance, a built-in ROM 171 stores an equipment key licensed from a license agency (not shown) for copyright protection in manufacturing by an equipment manufacturer. The information storage medium 18 is, for instance, a CPRM-compliant disk which is read only information (such as DVD-R) or writable and readable information (such as DVD-RW, DVD-RAM and SD memory), and a unique identifier (hereinafter referred to as medium unique identifier) assigned uniquely at every medium is added to the disk in being manufactured by the medium manufacturer. And also the medium key information licensed from the license agency in advance is added to the disk to record it in control information storage areas thereof, respectively.

The configuration of the system provides encrypted content by using the communication line 10 basically. The present invention however enables a user in an environment in which the communication lime 10 with a high-speed is not available or a user before a user registration to use the system. The present invention therefore copies legally the encrypted content on the storage medium 18 by means of the copying device 16 and sells at a charge or distributes at no charge the copied storage medium 18. Then, for viewing the encrypted content recorded on the copied storage medium 18, the system is configured to set the storage medium 18 in the terminal device 17 and access to the key distribution device 14 from the terminal device 17 via the communication line 10 then distribute a key to decrypt the encrypted content to the terminal device 17 from the key distribution device 14.

Hereinafter, configurations of each device will be described specifically.

In FIGS. 1A, 1B and 1C, the content encryption device 11 receives content from a copyright owner or a copyright manager by a content receiving unit 111 to send it to an encrypted content generation unit 112. On the other hand, a content key generation unit 113 generates a content key in accordance with random numbers, etc. An equipment key storage unit 114 stores an equipment key which is licensed from the license agency (not shown) in advance and is set to reproduction equipment of the terminal device 17. The content generation unit 112 encrypts the content received on the basis of the content key and equipment key to generate the encrypted content and stores it in an encrypted content storage unit 115.

If there are constrained conditions from the copyright owner or copyright manager, or those from the license agency, the medium manufacturer, an equipment manufacturer, and the like, an encryption condition processing unit 116 presents condition information to the encrypted content generation unit 112 if necessary. If there is any option in relation to provision content, an option information processing unit 117 presents the option information to the content generation unit 112. When the condition information and option information are presented, the content generation unit 112 adds the information in encrypting the content.

As for the option information, it includes information to identify the copyright owner or copyright manager, information to identify the content distribution device 13, information to identify the content key distribution device 14, information to identify a region, information to identify the medium manufacturer, information to identify the equipment manufacture, content identification information, information to indicate content viewing conditions and control attached information of the content, etc. As for the control attached information, it includes, for instance, menu information, transition information in the content (thumbnail, menu link, etc.), external linkage information (connection address for the Internet, etc.), guidance information (character, still image, etc.).

The generated encrypted content is issued to the content distribution device 13 and the encrypted content copying device 16, and the content key used in encrypting the content is issued to the content key encryption device 12. The key encryption device 12 once stores the content key received from the content encryption device 11 in a content key storage unit 121. On the other hand, the key encryption device 12 acquires the equipment key information in advance from the license agency to store it in an equipment key storage unit 122 and acquires the content identification information including the medium information (medium key information and medium unique identifier) from the user terminal device 17 which has been requiring viewing through the below-mentioned the content key distribution device 14 and the communication line 10. A key generation unit 123 then takes in the content key corresponding to the content specified by the content identification information from the key storage unit 121 to encrypt the content key on the basis of a part or the whole of the medium information and the equipment key (including option information if it is present), stores the generated encrypted content key in a storage unit 124 to add authentication information by means of an encrypted content key issue unit 125, and then transfers it to the content key distribution unit 14.

The key encryption device 12 acquires the medium key information of the copied medium 18 from the license agency in advance in order to enable legal decryption of the encrypted content through a copied medium distribution and stores it in a medium key information storage unit 126. And when viewing for the encrypted content recorded on the copied medium 18 is requested, a medium information processing unit 127 reads out the corresponding medium information from the key information storage unit 126 to transfer it to the key generation unit 123. And the key encryption unit 12 issues the encrypted content key which is possible to be decrypted only in reproducing the encrypted content recorded in the copied medium 18 which has been viewing-required.

The medium information processing unit 127 checks if the stored medium key information licensed from the license agency is the medium key information acquired from the content encryption device 11. And if they are not matched with each other, the information processing unit 127 conducts handling to store them as if they have been licensed from the license agency or to stop encryption of the content key as if they have not been licensed.

The content distribution device 13 stores the encrypted contents titled with a plurality of titles generated from the content encryption device 11 in an encrypted content storage unit 131 in advance. Then, when a specification/distribution of the content is instructed from the user management device 15, a content distribution device 132 distributes the corresponding encrypted content to the user terminal device 17 of the request origin via the communication line 10.

When receiving an instruction to distribute the content key from the user management device 15, the content key distribution device 14 receives a part or the whole of the medium information of the information storage medium transmitted from the terminal device 17 via the communication line 10, receives the option information if necessary and requires issue of the encrypted content key (content identification information) to the content key encryption device 12. In response to this request, the key distribution device 14 stores the encrypted content key issued from the key encryption device 12 in an encrypted content key storage unit 142. And then, an encrypted content key distribution unit 143 distributes the encrypted content key to the terminal device 17 of the viewing request origin via the communication line 10 on the basis of the instruction content of a content key distribution.

The user management device 15 stores user information, including personal information, viewing conditions information, etc., of the registered user, in a user information storage unit 151 in advance. When access is made from the terminal device 17 via the communication lime 10, a user management unit 152 performs negotiations, such as user authentication, medium information request, viewing condition confirmation and content specification to and from the terminal device 17, sends a content distribution instruction to the content distribution device 13 and sends a content key distribution instruction to the content key distribution device 14. When the distribution is fixed, a charging processing unit 153 charges to a viewing requiring user and conducts an authentication confirmation to and from electronic money (Web money) enterprise if circumstances require.

Here, the user information storage unit 151 manages information to achieve charging processing to a service subscriber and user information, such as an ID/password, an address, a name, a birth date, and a phone number to authenticate the access from the terminal device 17. Other than this, the information storage unit 151 manages an ID/password for access generated from an ID/password for access issuing unit 154 as a non-subscriber user.

Further, the user management device 15 issues the ID/password for access as authentication information for a guest by the issuing unit 154 for a user desiring to get the ID/password for access to view the content other than the registered user to store it in the user information storage unit 151 and also provides it to the encrypted content copying device 16. Thereby, when the access authentication is made by ID/password for guest access, the user management unit 15 determines that it is a request for viewing the copied medium 18, then, becomes possible to issue the corresponding encrypted content key.

In the case of necessity of charging, the charging processing unit 153 sends information to an authentication system, such as Web money owned by the electronic money enterprise to acquire information on the possibility of charging. In either case of a user to be charged or a user not to be charged, when it is confirmed that the sent information is the ID/password for access stored in the user information storage unit 151, the user management unit 152 issues the authentication information to the terminal device 17.

The encrypted content copying device 16 stores the encrypted content of the specified title from the content encryption device 11 in advance to an encrypted content storage unit 161. The copying device 16 reads out the encrypted content from the storage unit 161 by means of an encrypted content copying unit 162 to write it in an information storage medium (aforementioned CPRM-compliant medium) having the medium key information licensed to the medium manufacturer from the license agency and the medium unique identifier uniquely assigned by the medium manufacturer, and then creates a medium, with the encrypted content copied thereon, titled with the specified title.

At this time, the copying unit 162 label-prints the authentication information for a guest (ID/password for access) issued from the user management device 15 on a copied medium package to present it, or writes it in the copied medium itself as a part of direct control information. It is not always necessary for the authentication information for the guest to be distributed together with the copied medium, and for example, a distribution only to a user who has required via the Internet is a possible approach. The copied medium 18 generated like this manner is distributed by a sale or a free distribution.

The foregoing copy processing adds the option information into the information storage medium if necessary. The option information includes information to identify the medium manufacture, information to identify the key distribution device, information to identify the equipment manufacturer, an tent identification information, information indicating content viewing contents, control attached information of content [for instance, menu information, transition information (thumbnail, menu link, etc.)], external-linkage information (connection address for the Internet, etc.), guidance information (character, still image, etc.), and the like.

Figure 2:
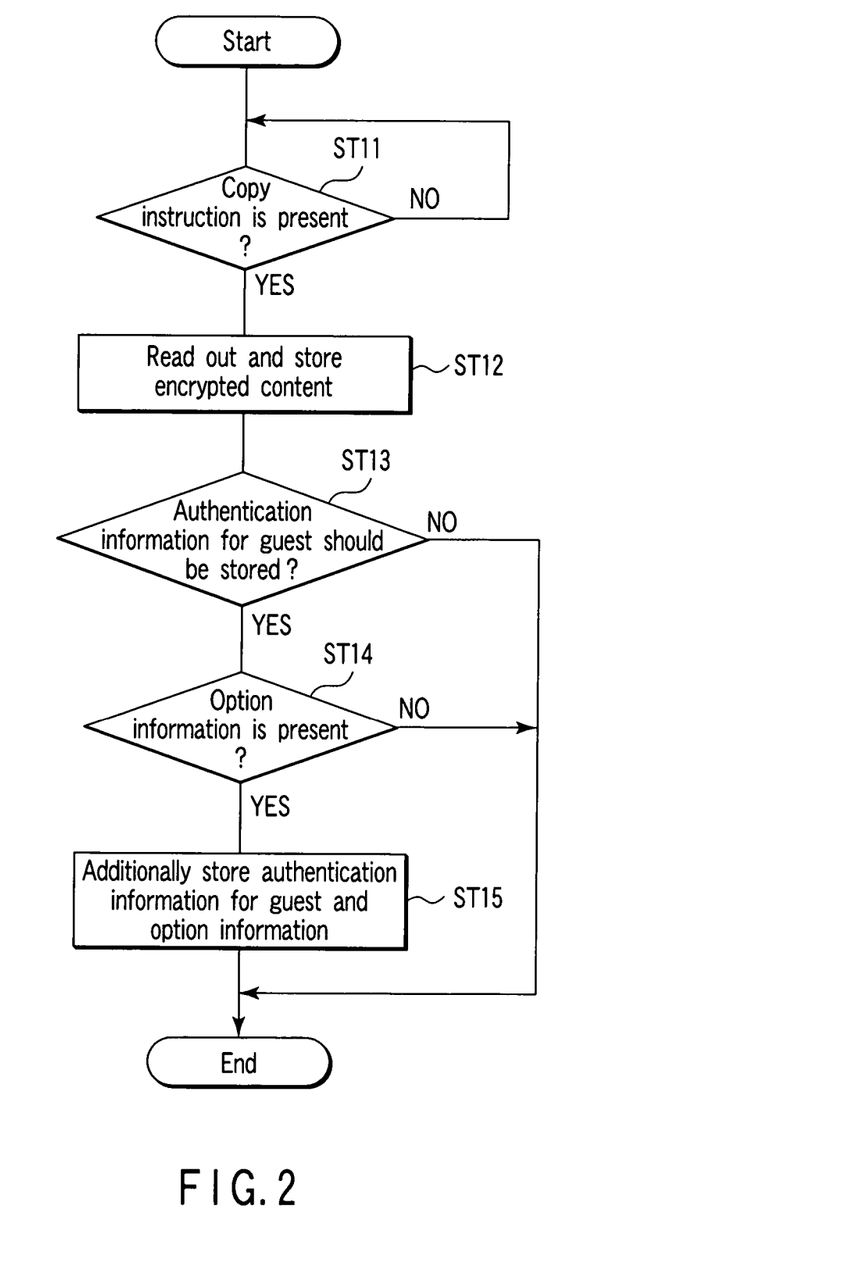
FIG. 2 is an exemplary flowchart for specifically explaining a flow of processing of an encrypted content copying device in FIGS. 1A, 1B and 1C.

That is to say, the aforementioned copying device 16 receives the copy instruction, as shown in FIG. 2 (ST11), reads out the corresponding encrypted content to store it in the information storage medium 18 (ST12) and determines if the authentication information for the guest should be stored (ST13). Further, the copying device 16 determines the presence or absence of the option information (ST14) and if the storage instruction for the authentication information for the guest is present and the option information is also present, additionally stores them in the information storage medium 18 together with the encrypted content (ST15). If the storage instruction of the authentication information for the guest is absent and the option information is also absent in the above-described determination (ST13 and ST14), the copying device 16 ends a series of processing.

Figure 3:
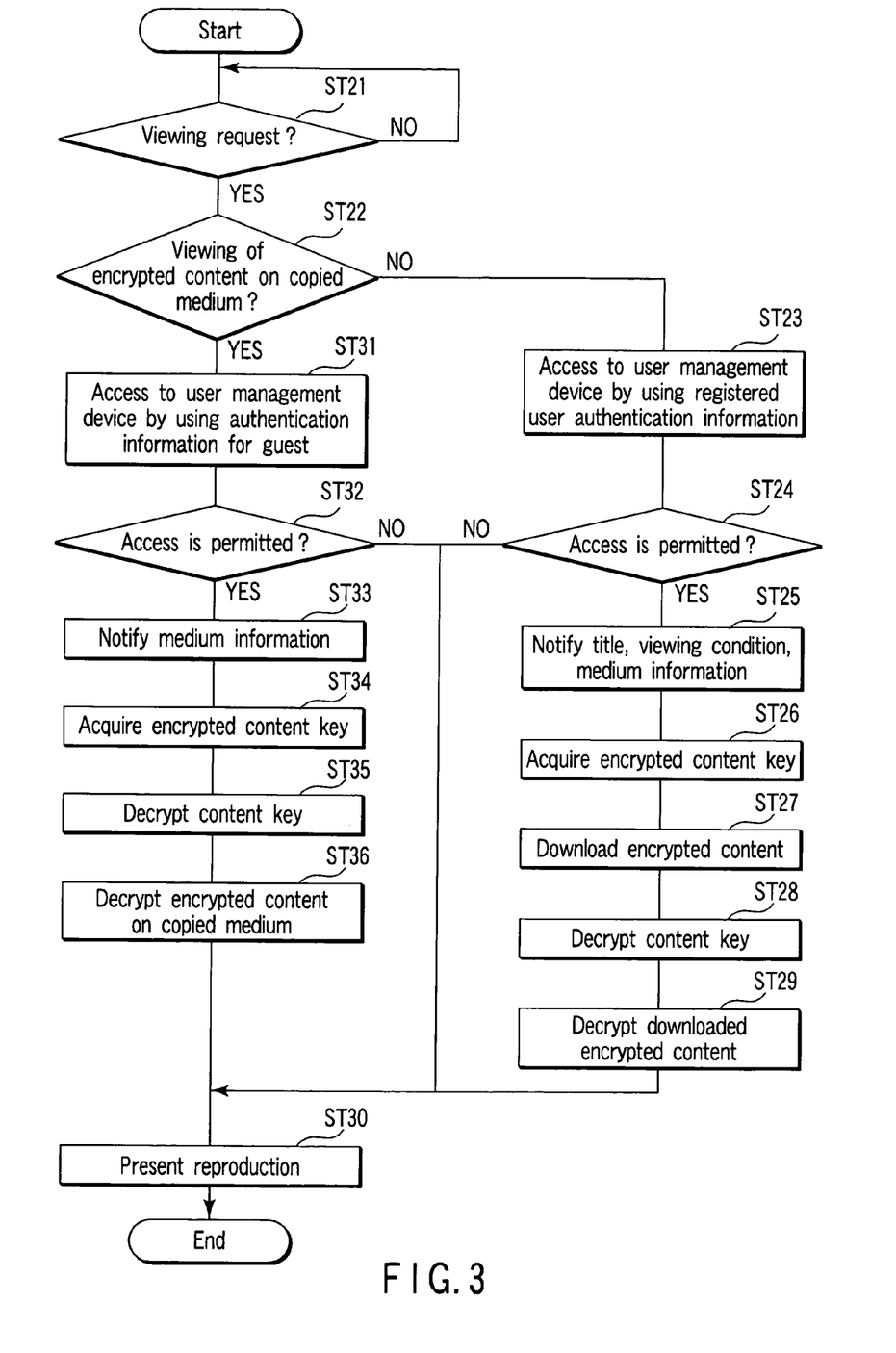
FIG. 3 is an exemplary flowchart for explaining specifically a flow of processing of a user terminal device in FIGS. 1A, 1B and 1C.

The user terminal device 17, as shown in FIG. 3, when the viewing request is made (ST21), determines whether or not the request is for the viewing of the encrypted content on the copied medium 18 (ST22). When the request is not the content viewing request for the copied medium 18, the terminal device 17 accesses to the user management unit 15 by using the ID/password for the access issued in performing the user registration (ST23), and after completion of the authentication (ST24), specifies the title and viewing conditions, etc., of the content to notify them to the management device 15 (ST25). At this moment, when receiving the authentication information from the management device 15, a user request processing unit 172 notifies the fact to a medium information issuing unit 173. When a part or the whole of the medium information of the information storage medium 18 set in a medium drive 174 is present and when the option information is present in the information storage medium 18 or in the stored encrypted content, the issuing unit 173 acquires the information depending on necessity to issues it to the content key distribution device 14.

With this issuing, an encrypted content key acquiring unit 175 receives the encrypted content key provided from the content key distribution device 14 to store it in a storage unit 176 (ST26). An encrypted content acquiring unit 177 receives the encrypted content provided from the content distribution device 13 to sore it in a (download) storage unit 178 (ST27). The encrypted content stored in the storage unit 178 can be written in the information storage medium 18 set in the medium drive 174, if necessary.

When a viewing request for the encrypted content stored in the aforementioned encrypted content storage unit 178 or the information storage medium 18, an encrypted content decryption unit 179 firstly reads out an encrypted content key to decrypt the encrypted content from the storage unit 176 to decrypt the content key (ST28) by using the medium information and the equipment key (ST29). The content decrypted in this manner is presented under a certain condition by a content presenting unit 1710 (ST30). That is, the encrypted content decryption unit 179 and the content presenting unit 1710 are presentation-controlled under the management of the user management device 15 through the user request processing unit 172.

In contrast, when the copied medium 18 is set in the medium drive 174 of the user terminal device 17 and encrypted content viewing of the copied medium 18 is requested in the step ST22, the user terminal device 17 accesses to the user management device 15 by using the authentication information for the guest has been added to the copied medium 18 (ST31). When the authentication information is written in the copied medium 18 itself, authentication information input work can be eliminated and the operability can be improved by being configured to automatically read out the authentication information to notify it to the user management device 15. In the case of receiving permission by the access for the guest (ST32), the terminal device 17 can acquire the encrypted content key (ST34) by notifying the medium information stored in the copied medium 18 to the user management device 15 (ST33). Hereinafter, like the case of downloading, the decrypted content is reproduction-presented (ST30) thorough the decryption of the content key (ST35) and the decryption of the encrypted content on the copied medium 18 (ST36). Thereby, the user terminal device 17 becomes possible to view the encrypted content on the set copied medium 18. And it is also possible for the user management device 15 to perform the charging processing in a charging method differing from that of for the registered user by notifying the authentication information for the guest and, for instance, it is also possible to let the user pay the viewing charge in advance by the electronic money.

Figure 4:
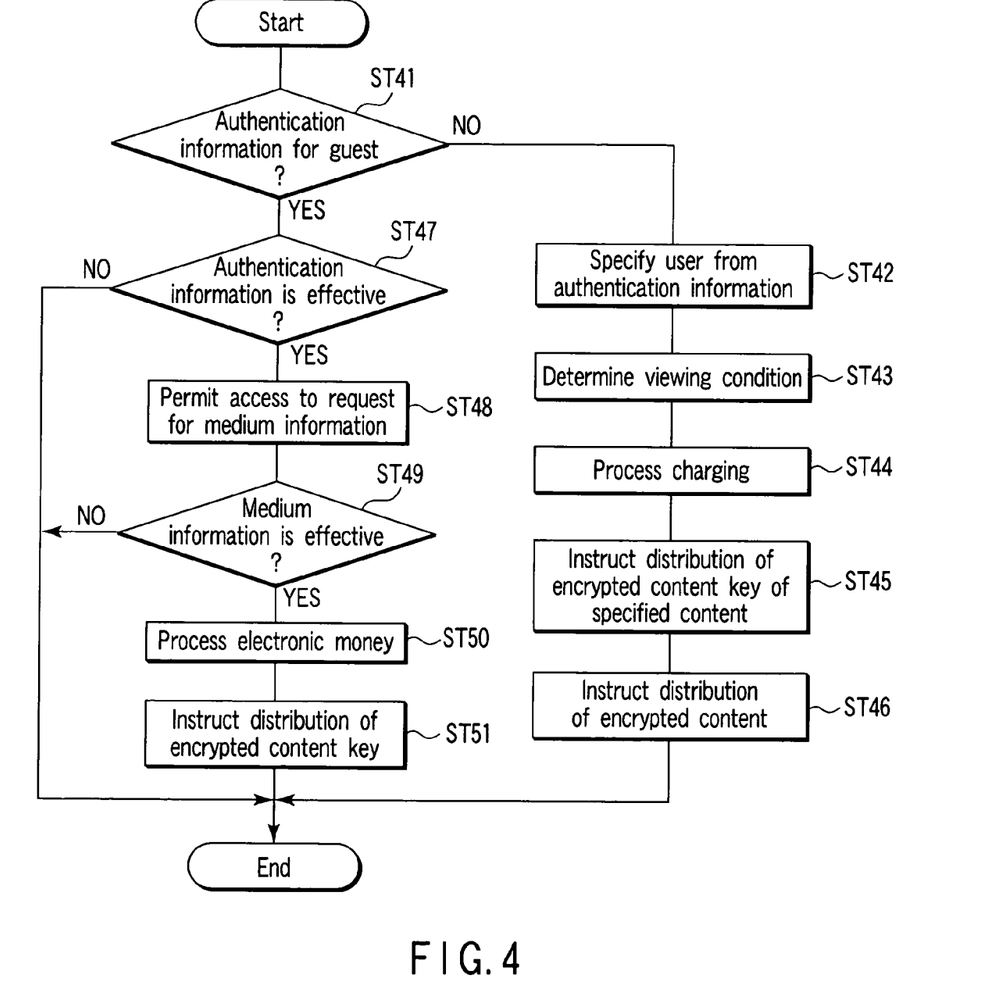
FIG. 4 is another exemplary flowchart for explaining specifically a flow of processing of a user terminal device in FIGS. 1A, 1B and 1C.

Hereinafter, the series of the processing of the user management device 15 will be described specifically by referring to FIG. 4.

At first, when the user terminal device 17 accesses via the communication line 10, the management device 15 determines whether or not the access is made with the authentication information for the guest (ST41), if the authentication information is not for the guest but for the registered user, it specifies the user in accordance with the authentication information (ST42). The management device 15 further determines the viewing conditions imposed to the specified user (ST43) to conducts charging processing along with the conditions (ST44). Next to this, the management device 15 instructs so as to distribute the encrypted content key of the specified content (ST45) and instructs the distribution of the encrypted content itself (ST46), and then ends the series of the processing.

If the access authentication is one for the guest, the management device 15 firstly determines the effectiveness of the authentication information (ST47), if it is not effective, terminates the series of the processing, and if effective, permits the access to request for the medium information (ST48). If the medium information of the copied medium 18 is presented from the user terminal device 17, the management device 15 determines the effectiveness of the medium information presented on the basis of the effectiveness information related to the copied medium registered in advance (ST49), and ends the series of the processing if it is not effective. If it is effective, the management device 15 proceeds to a procedure to use the electronic money (ST50) to instruct the distribution of the encrypted content key (ST51), then ends the series of the processing.

According to the above-described configuration, having basically provided the encrypted content though the communication line 10, even though the user in the environment impossible to use the communication line 10 with a high-speed, downloading of the content with a large quantity becomes unnecessary, and only receiving a key distribution is required. Therefore, the user can view the content by participating to this system for proving the information. Simultaneously, a load reduction in the communication line 10 is achieved.

Even though the user has not made its registration yet, the user can get the key for the encrypted content decryption to view the content and the system becomes extremely effective for the user who fears the personal information to be abused.

Because the copied medium is a rewritable medium, when the stored content becomes unnecessary one and further, for example, when the user made its user registration and gets other content, the user can use the medium to store the content therein.

In the embodiment given above, in requiring the issue of the encrypted content key to the content key encryption device 12, the user needs content identification information to specify the content. The identification information; however, may be acquired in a manner such that the content encryption device 11 adds the identification information in the encrypted content, the copying device 16 adds it in the information storage medium 18 and the medium drive 173 of the terminal device 17 acquires it, and maybe issued from the content key distribution device 14 together with the medium information. Furthermore, the content identification information may be stored in the user information storage unit 151 in associated with the ID/password for the access when the ID/password is issued from the ID/password for the access issuing unit 154 in accordance with the information, from the copyright owner and copyright manager, from the content encryption device 11, from the encrypted content copying device 16 and from the content key distribution device 14, etc., and then, the identification information may be taken out by the user management unit 152 to issue it to the medium information acquiring unit 141 or issued to the user terminal device 17 when the user management unit 152 receives the viewing request from the user terminal device 17.

As descried above, in this embodiment, the content encryption device 11 generates the encrypted content, and the encrypted content copying device 16 copies only the encrypted content to one or more information storage media 18. At this moment, the copying device 16 adds the option information to the content as the occasion demands. The copied information storage medium 18 should be sold at a charge or distributed at no charge.

The user gets the storage medium 18 to connect or set it to or in the user terminal device 17, accesses to the user management device 15 to receive permission by means of the authentication information distributed together with the storage medium 18 and presents a part or the whole of the medium information to the content key distribution device 14.

The content key distribution device 14 makes a request for issuing the encrypted content key to the content key encryption device 12, and the key encryption device 12 extracts the corresponding content key to encrypt it in accordance with a part or the whole of the equipment key information, with the medium information and also with the option information as the need arises, and issues the encrypted content key to the content key distribution device 14. The key distribution device 14 then distributes the encrypted content key to the user terminal device 17.

Therefore, the user can get the encrypted content having an enormous quantity of data without using any communication line and reduce the load on the communication line, and further, the user can use even a communication line with a low communication speed.

In the embodiment given above, in the case of the user as the service subscriber at the content key distribution device, although the information for achieving the charging processing and the ID/password for authenticating the access from the user terminal device are associated with the user information and managed by the user information storage unit, another configuration of the information provision system is also a possible approach. That is, to use the information storage medium with the encrypted content created from the encrypted content copying device recorded thereon so as to enable even a service-non-subscriber user to access the content, the content key distribution device is provided with the ID/password for access issuing unit. And the system uses the ID/password issued form the issuing unit, distinguishes the service subscriber user from the non-subscriber Thereby, it becomes possible even for the non-subscriber user to use the content in a manner in which the copyright is protected, to perform spot use in accordance with charging used the electronic money such as Web money or to be induced to become a service subscriber by participating promotional use without any charge.

In the above-mentioned embodiment, a system having been presented on the premise that the content can be downloaded through the communication line, the present invention can be achieved similarly even in a system which does not distribute the content via the communication line. And in the above-mentioned embodiment, a system having been presented on the premise that uses CPRM-compliant medium, the present invention can be achieved similarly even in a system which uses AACS-compliant medium.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A system for providing content to a user terminal using a portable storage medium to which medium information is written, the system comprising:
   a content encryption device arranged to receive content from a content provider and to encrypt the content using a content key generated in association with the content;
   an encrypted content copying device arranged to receive the encrypted content from the content encryption device, copy the encrypted content to the portable storage medium, write the medium information to the portable storage medium, and issue temporary authentication information, wherein the medium information includes a medium unique identifier prepared on the user terminal and medium key information;
   a content key generation device arranged to generate the content key to encrypt the content;
   a user management device arranged to receive temporary authentication information from the user terminal and, upon positive authentication, to receive the written medium information from the user terminal, and to output an instruction to encrypt a content key of the encrypted content and distribute the encrypted content key;
   a content key encryption device arranged to encrypt the content key of the encrypted content, using the written medium information, in response to the instruction to encrypt the content key of the encrypted content; and
   an encrypted content key distribution device arranged to receive the written medium information from the user terminal via a communication line, to transmit the medium information to the content key encryption device, and to transmit the encrypted content key generated by the content key encryption device to the user terminal via the communication line in response to the instruction to distribute the encrypted content key;
   wherein the encrypted content copying device further configured to copy the temporary authentication information to the portable storage medium.

2. The system according to claim 1, wherein
   the user management device receives authentication information from the user terminal and, upon positive authentication, to receive content designation information from the user terminal, and outputs an instruction to encrypt a content key of a user's designated content and distributes the encrypted content key; and
   the content key encryption device encrypts the content key of the user's designated content, using the medium information written to the portable storage medium, in response to the instruction to encrypt the content key of the user's designated content;
   the system further comprising:
   an encrypted content distribution device arranged to store a plurality of encrypted contents which are encrypted in advance by the content encryption device and to distribute a designated one of the plurality of encrypted contents to the user terminal via the communication line based on the content designation information and a content distribution instruction.

3. A method for providing content to a user terminal using a portable storage medium to which medium information is written, the method comprising:
   receiving, by a content encryption device, content from a content provider and encrypting the content using a content key generated in association with the content;
   receiving, by an encrypted content copying device, the encrypted content from the content encryption device, copying the encrypted content to the portable storage medium, writing the medium information to the portable storage medium, and issuing temporary authentication information, wherein the medium information includes a medium unique identifier prepared on the user terminal and medium key information;
   generating, by a content key generation device, the content key to encrypt the content;
   receiving, by a user management device, temporary authentication information from the user terminal and, upon positive authentication, receiving the written medium information from the user terminal, and outputting an instruction to encrypt a content key of the encrypted content and distribute the encrypted content key;
   encrypting, by a content key encryption device, the content key of the encrypted content, using the written medium information, in response to the instruction to encrypt the content key of the encrypted content; and
   receiving, by an encrypted content key distribution device, the written medium information from the user terminal via a communication line, transmitting the medium information to the content key encryption device, and transmitting the encrypted content key generated by the content key encryption device to the user terminal via the communication line in response to the instruction to distribute the encrypted content key;
   wherein the encrypted content copying device copies the temporary authentication information to the portable storage medium.

* * * * *

UNITED STATES PATENT AND TRADEMARK OFFICE
CERTIFICATE OF CORRECTION

PATENT NO. : 8,995,661 B2
APPLICATION NO. : 11/453092
DATED : March 31, 2015
INVENTOR(S) : Kurihara Page 1 of 1

It is certified that error appears in the above-identified patent and that said Letters Patent is hereby corrected as shown below:

In the Claims

Claim 1, column 13, line 41, change "device further" to --device is further--.

Signed and Sealed this
Eleventh Day of August, 2015

Michelle K. Lee
*Director of the United States Patent and Trademark Office*